United States Patent
Mohr et al.

(10) Patent No.: US 6,412,608 B1
(45) Date of Patent: Jul. 2, 2002

(54) ACTUATOR ASSEMBLY FOR A VEHICLE BRAKE WITH SUCH AN ACTUATOR ASSEMBLY

(75) Inventors: Kurt Mohr, Halsenbach/Ehr.; Frank Martin Müller, Konken, both of (DE)

(73) Assignee: Lucas Industries public limited company (GB)

( * ) Notice: Subject to any disclaimer, the term of this patent is extended or adjusted under 35 U.S.C. 154(b) by 0 days.

(21) Appl. No.: 09/226,360

(22) Filed: Jan. 6, 1999

Related U.S. Application Data (63) Continuation of application No. PCT/EP97/03627, filed on Jul. 9, 1997.

(30) Foreign Application Priority Data

Jul. 9, 1996 (DE) .......................................... 196 27 646

(51) Int. Cl.[7] .............................................. F16D 55/22
(52) U.S. Cl. ...................... 188/72.9; 188/72.8; 188/156
(58) Field of Search ................................. 188/156, 157, 188/158, 161, 162, 72.6, 72.7, 72.8, 72.4

(56) References Cited

U.S. PATENT DOCUMENTS

| | | | |
|---|---|---|---|
| 2,038,707 A | 4/1936 | Begg | |
| 2,279,274 A | * 4/1942 | Johnson et al. | ............. 188/72.8 |
| 3,809,191 A | 5/1974 | Woodward | ................... 188/156 |
| 4,154,321 A | * 5/1979 | Falk | ........................... 188/72.9 |
| 4,681,194 A | 7/1987 | Tsuruta | |
| 4,784,244 A | * 11/1988 | Carre et al. | ................... 188/156 |
| 4,809,823 A | * 3/1989 | Fargier | ....................... 188/72.7 |
| 5,348,123 A | 9/1994 | Takahashi et al. | |
| 5,531,298 A | 7/1996 | Brooks, Sr. et al. | |

FOREIGN PATENT DOCUMENTS

| | | | | |
|---|---|---|---|---|
| DE | 26 18 966 A1 | 11/1977 | | |
| DE | 33 25 776 A1 | 1/1985 | | |
| DE | 2847260 | * 5/1986 | | ................ 188/72.6 |
| DE | 3545800 A1 | 7/1986 | | |
| DE | 3600733 A1 | 7/1986 | | |
| JP | 62159819 | 7/1987 | | |
| JP | 04146866 | 5/1992 | | |

* cited by examiner

*Primary Examiner*—Matthew C. Graham
(74) *Attorney, Agent, or Firm*—MacMillan, Sobanski & Todd, LLC (57) ABSTRACT

The invention relates to an actuator assembly for a vehicle brake with a drive which is connected with an input side of a transmission. An output side of the transmission is adapted for the actuation of at least one friction element of the vehicle brake, with the transmission being a knee lever arrangement with two arms.

21 Claims, 9 Drawing Sheets

ACTUATOR ASSEMBLY FOR A VEHICLE BRAKE WITH SUCH AN ACTUATOR ASSEMBLY

CROSS-REFERENCE TO RELATED APPLICATIONS

This application is a continuation of copending International Application PCT/EP97/03627 filed on Jul. 9, 1997 and which designated the U.S.

BACKGROUND OF THE INVENTION

The invention relates to an actuator assembly for a vehicle brake as well as a vehicle brake with such an actuator assembly.

In the field of motor vehicles there are tendencies to abandon hydraulically operated cylinder/piston arrangements and to realize electrically operated vehicle brakes (brake-by-wire).

Generally, each vehicle wheel of each motor vehicle is provided with a braking unit which is formed by a disk or drum brake as well as a brake piston. The brake piston acts hydraulically or pneumatically on the disk or drum brake. Each brake piston is either associated with an individual booster, or all brake pistons are controlled by a common brake booster. The behaviour of one or several vehicle wheels with respect to deceleration or acceleration, respectively, is monitored via an electronic control unit. In addition, further parameters of the braking operation, e.g. the actuation travel of the brake pedal, the brake pedal actuation speed, the brake pedal actuation force, are sensed and evaluated. From this (and, if required, additional) data the electronic control unit determines a necessary brake force assistance and activates the brake booster of the respective brake or modulates the brake force of the common brake booster, which is available for all braking units, whereupon the hydraulic brake cylinder pressure which is solely applied by the pedal actuation force is amplified accordingly.

For safety reasons, all of these known braking systems are equipped with a direct hydraulic connection between the pedalactuated master cylinder and the brake pistons besides an electronic activation, in order to enable the brake to continue to be actuated even in the case of a failure of the electronic system.

From DE 35 45 800 A1 a control device for vehicle wheels is known wherein a wheel cylinder and a brake cylinder are arranged in the brake caliper of each wheel of a motor vehicle. A piezoelectric actuation device is arranged in the brake caliper in such a manner that it is connected with the wheel cylinder. Upon the application of an electric voltage to the piezoelectric actuation device, the piston within a sleeve is displaced and changes the volume of the hydraulic fluid in the wheel cylinder. From a master cylinder brake fluid is supplied via a fluid duct in the brake caliper to the wheel cylinder, with said fluid duct being adapted for opening and closing by means of a control valve. When a high pressure prevails in the brake cylinder the piezoelectric actuation device expands, and the control valve closes. Subsequently, the electric voltage at the piezoelectric actuation device is reduced, whereby the pressure in the wheel cylinder is reduced. The piston which is guided within the sleeve must be supported in a fluid-tight and low-friction manner in order to enable a low-delay actuation of the brake piston. This causes high manufacturing costs and implies expensive assembly.

A similar control device for vehicle brakes is known from DE 36 00 733 A1, wherein a brake piston is arranged within the wheel cylinder, in whose interior a piezoelectric piston device is provided. Here, the brake piston (together with the piezoelectric piston device) is caused to carry out a feed motion of the brake by hydraulic fluid via a master cylinder. Thereby the brake piston together with the piezoelectric piston device moves under the action of the hydraulic fluid in the wheel cylinder. In addition to the hydraulically induced feed motion, the piezoelectric piston device which acts immediately on a brake lining can be activated. With this arrangement, too, guidance and support of the piezoelectric piston device in the brake piston is crucial with respect to the fluid-tight sealing and the low-wear and low-inertia guidance and support of same.

In the case of electrically operated brakes, however, the fact that the required force-travel characteristic (increasing force with increasing feed motion) of the force acting on friction element is not provided by the known electrically operatable actuators constitutes a problem.

The piezoelectric actuation means known from DE 35 45 800 A1 features an arrangement whose functioning capability is only very limited because the maximum travel of the piezoelectric element (and thus the displaced volume of the hydraulic fluid) is far too small. Moreover, a piezoelectric element has only a minimum force output, i.e. the variation of its characteristic is opposite to that of the desired force-travel characteristic.

The invention is therefore based on the object to provide an electrically operatable actuator assembly for a vehicle brake which does not have these drawbacks. This object is solved by the actuator assembly as described herein. Further characteristics, advantages and properties of the invention will be explained by means of the following description with reference to the drawings.

BRIEF DESCRIPTION OF THE SEVERAL VIEWS OF THE DRAWINGS

FIG. 1b shows a diagram of the input and output forces of the knee lever arrangement according to FIG. 1a.

FIG. 2b shows a diagram of the input and output forces of the knee lever arrangement according to FIG. 2a.

FIG. 3b shows a diagram of the input and output forces of the knee lever arrangement according to FIG. 3a.

FIG. 4 shows shows a diagram of the ratios between the input strokes and the output strokes of the knee lever arrangements according to FIGS. 1a, 2a, 3a.

DETAILED DESCRIPTION OF THE INVENTION

Figure 1A:
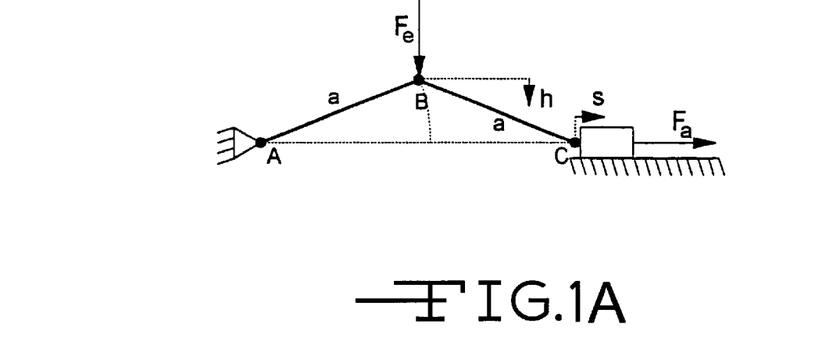
FIG. 1a shows an inventive knee lever arrangement for actuating a vehicle brake as a schematic illustration of a first embodiment.

FIG. 1a shows an equal-angle knee lever transmission which consists of two identical levers AB, CB with a length a and three points of articulation A, B and C. The point of articulation A is supported by a location bearing and the point of articulation C is supported by a floating bearing, while the two levers are joined with each other in the point of articulation B.

If an input force $F_e$ is introduced in a vertical direction into the point of articulation B this results in an output force $F_a$ in a horizontal direction in the point of articulation C. The point of articulation B thereby moves vertically downwards by an input travel h, while the point of articulation C moves horizontally to the right by an output travel s.

Figure 1B:
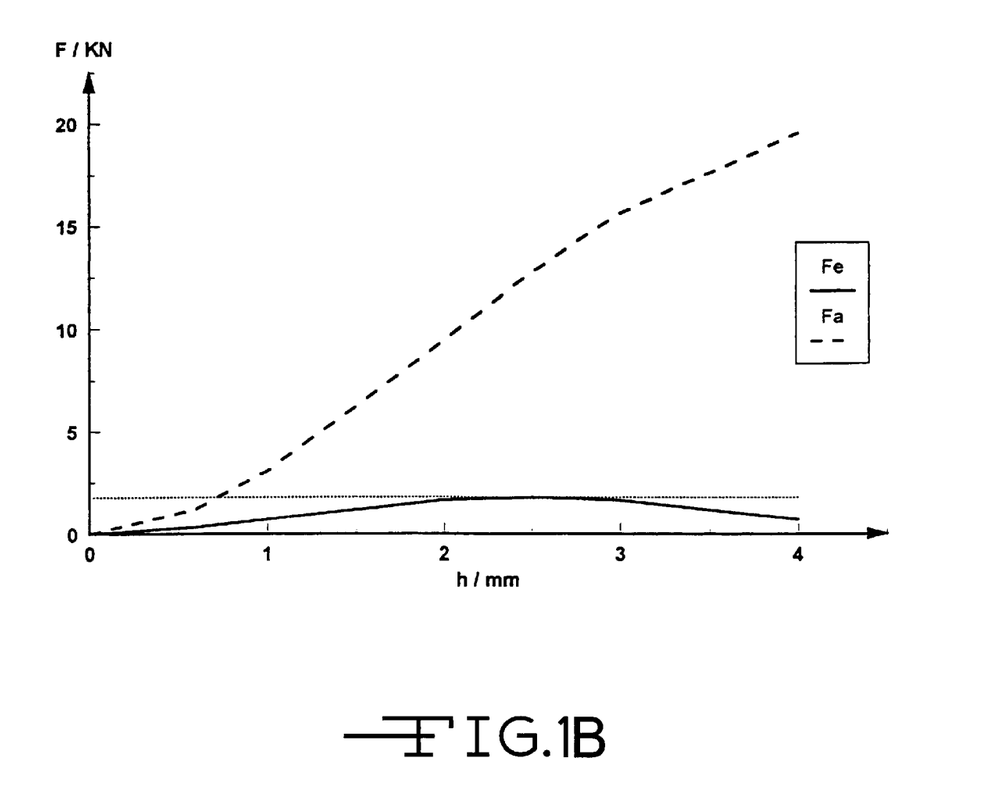

In a force-travel diagram of FIG. 1b for the knee lever transmission contemplated in FIG. 1a the input force $F_e$ as well as the output force $F_a$ are plotted each as a function of the in-put travel h. In this case the curve of the output force $F_a$ corresponds to exemplary requirement profile to be met by a vehicle brake, according to which an output force $F_a$ of approx. 20 KN is to be applied at an output travel s of approx. 0.7 mm. In order to achieve this a maximum input travel h of approx. 4 mm must be covered, whereby a maximum input force $F_e$ of approx. 2 KN has to be applied over the input travel.

Figure 2A:
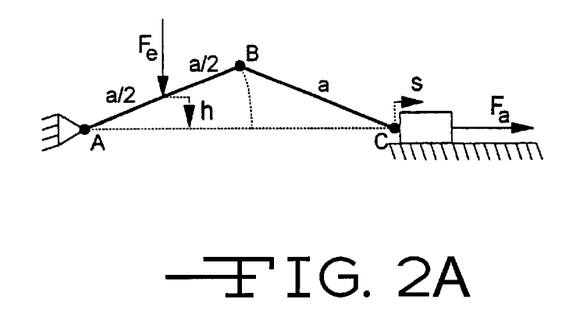
FIG. 2a shows an inventive knee lever arrangement for actuating a vehicle brake as a schematic illustration of a second embodiment.

Compared to the knee lever transmission shown in FIG. 1a, the input force $F_e$ is introduced in the knee lever transmission shown in FIG. 2a directly via the lever AB, with the point of force introduction being in the middle (at a/2) of the lever AB.

Figure 2B:
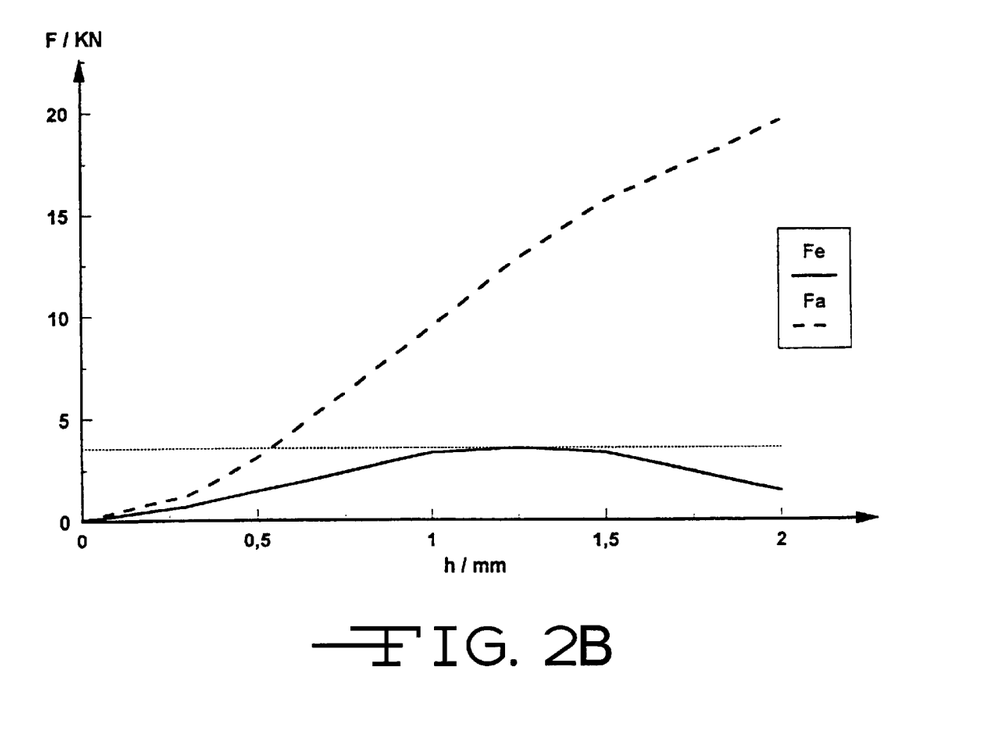

As can be seen from the associated force-travel diagram in FIG. 2b which is also based on the requirement profile with an output force of approx. 20 KN at an output travel s of approx. 0.7 mm, as is typical for a vehicle brake, an input travel h of only approx. 2 mm must be covered here, though a maximum input force $F_e$ of approx. 4 KN must be applied.

Such a design of the knee lever transmission in its tendency, therefore, favours the use of an actuator which is constructed of piezoelectric elements, which in fact is capable of exerting a very high force (input force $F_e$) but can perform only a very small stroke (input travel h). This tendency can be enhanced correspondingly by further shifting the point of force introduction in the direction of the point of articulation A. If the point of force introduction were for example to be located at a distance of a/4 from the point of articulation A, an input force $F_e$ of approx. 8 KN would have to be applied and an input travel h of approx. 1 mm would have to be covered in order to comply with the previously mentioned requirement profile.

Figure 3A:
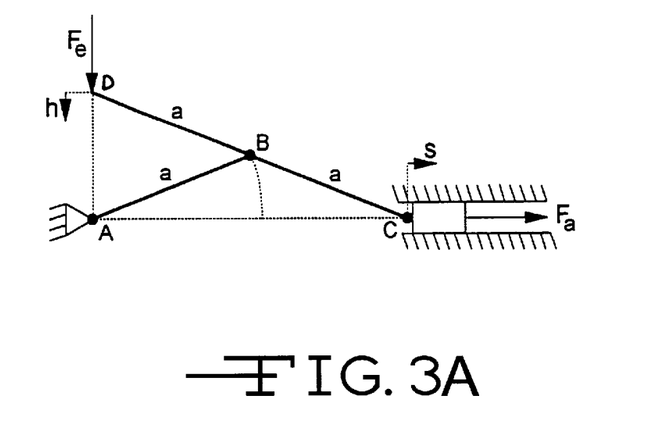
FIG. 3a shows an inventive knee lever arrangement for actuating a vehicle brake as a schematic illustration of a third embodiment.

The knee lever transmission shown in FIG. 3a shows a lever CBD which is extended by the length a to the length 2a, with the input force $F_e$ being introduced into the point D at the free end of said lever. The point of articulation B remains the hinge point for the arm AB.

It can be seen from the associated force-travel diagram shown in FIG. 3a that such a design calls for a maximum input force $F_e$ of merely approx. 1 KN for the given requirement profile of approx. 20 KN output force $F_a$ at an output travel s of approx. 0.7 mm. In this case, however, an input travel h of approx. 8 mm must be covered so that with such an arrangement an electromagnet arrangement or an electric motor which drives a screw for converting a rotation motion to a translation motion is preferred as the actuator.

It proves to be a particular advantage of the knee lever transmission contemplated in FIG. 3a that the point of force introduction for the input force $F_e$ moves (downwards) in the same direction as the input travel h on a vertical line on the point A. Compared to that, the point of force introduction of the knee lever transmissions contemplated in FIG. 1a and FIG. 2a follows a circular arc-shaped line about the point of articulation A. Therefore, the practical implementation of the knee lever transmission according to FIG. 3a requires less design expenditure than the knee lever transmissions according to FIGS. 1a and 2a.

The embodiment according to FIG. 3a is also advantageous in that almost no forces in the vertical direction are effective in the point of articulation C, but mainly only the output force $F_a$ is effective in a horizontal direction. Therefore, the support of the point of articulation C must accommodate almost no reaction forces so that a simple guide is sufficient, which again simplifies the design configuration. Lever lengths a of approx. 30 mm and angles between the levers AB or CB, respectively, and the imaginary line AC or CA, respectively, of approx. 10 degrees prove to be characteristic for the geometry of the knee lever transmissions contemplated in FIGS. 1a, 2a as well as 3a. Thus, integration into the installation space which is available in a vehicle brake—both a disk as well as a drum brake—is possible without any problems. Due to the longer lever, the knee lever transmission according to FIG. 3a requires a slightly larger installation space than the knee lever transmissions according to FIGS. 1a and 2a so that this is particularly suited for the integration into a drum brake which provides a larger installation space than a disk brake.

Figure 3B:
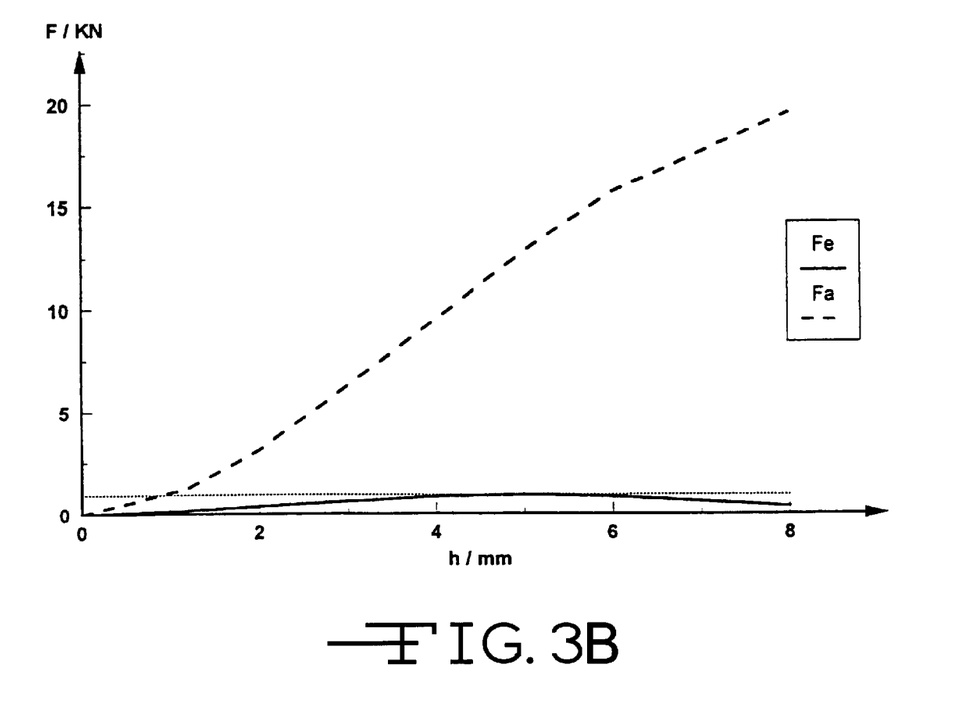

It should also be mentioned that the use of levers with different lengths does not result in decisive changes. In an equal-angle knee lever transmission, however, shortening of the length a of both levers AB, CB causes an increase of the input travel s so that a tendency towards the behaviour shown in FIG. 2b will develop, while an extension of the length a of both levers AB, CB results in a decrease of the input force $F_e$ with an increase of the input travel s so that a tendency towards the behaviour shown in FIG. 3b will develop.

Figure 4:
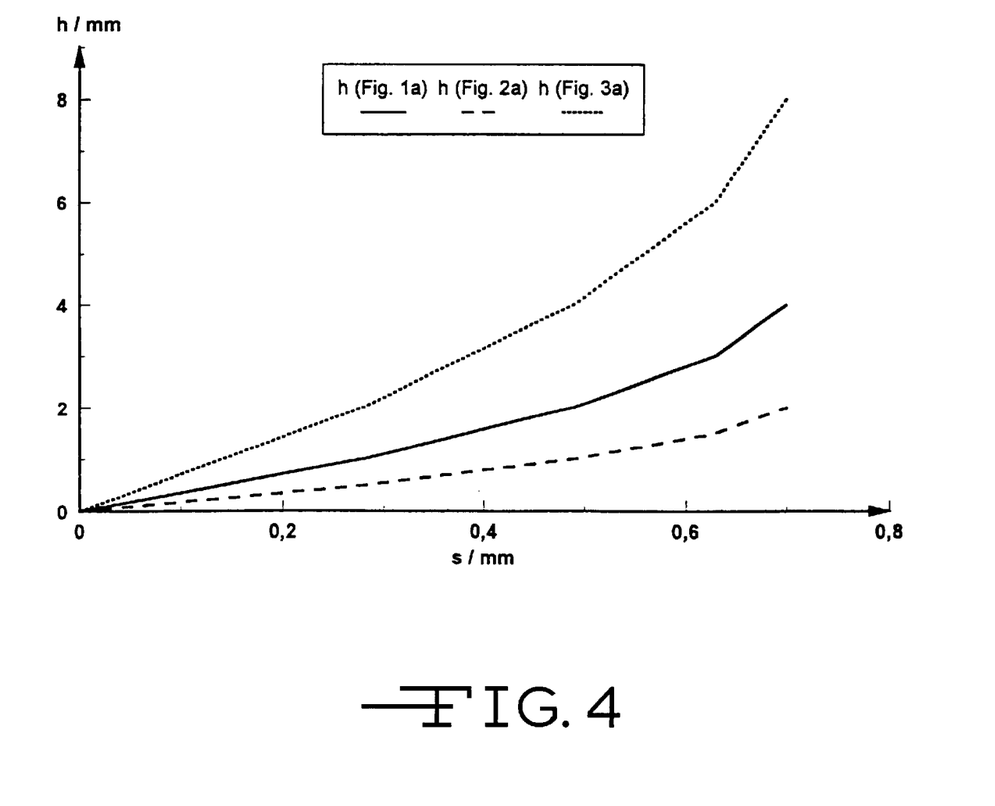

In a travel-travel diagram in FIG. 4 the input travel h as a function of the output travel s is shown for the knee lever transmissions according to FIGS. 1a, 2a as well as 3a. From this it can be seen that, as already explained, a input travel of approx. 4 mm must be realizable at a required output travel h of approx. 0.7 mm for the knee lever transmission according to FIG. 1a, a input travel h of approx. 2 mm must be realizable for the knee lever transmission according to FIG. 2a, and a input travel h of approx. 8 mm must be realizable for the knee lever transmission according to FIG. 3a.

Figure 5:
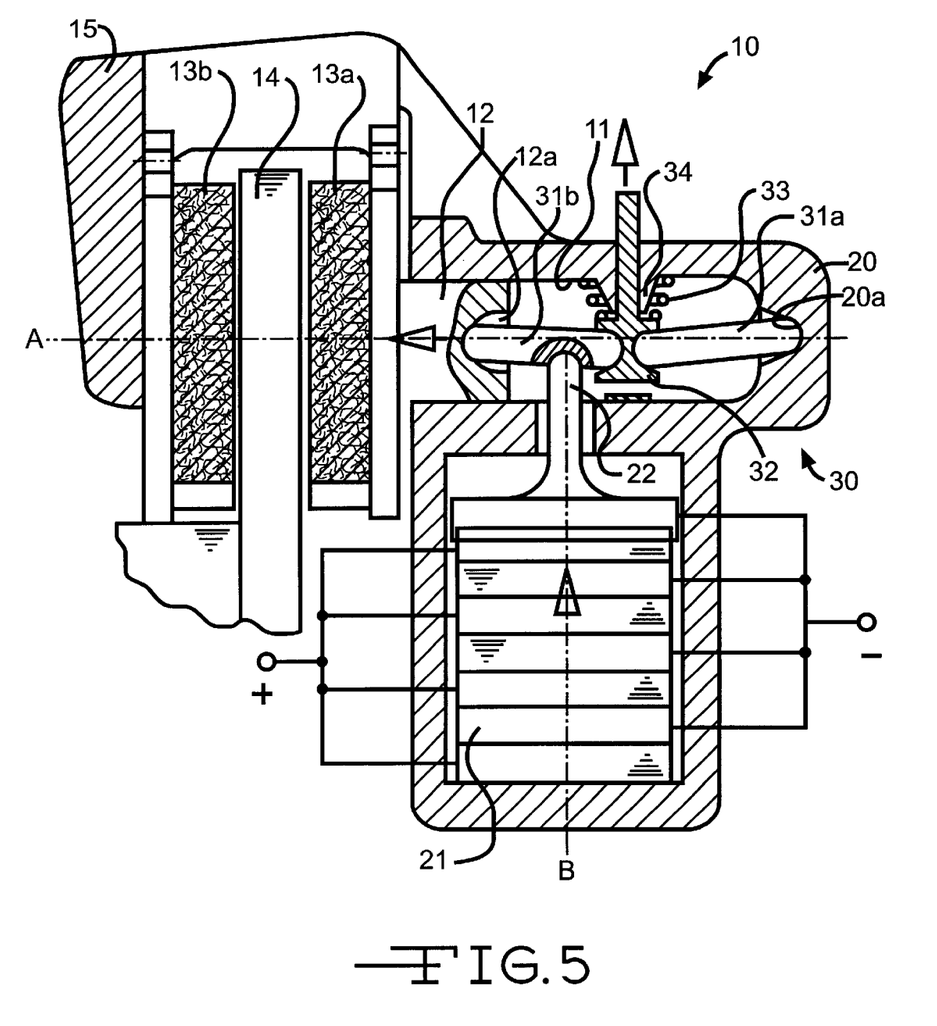
FIG. 5 shows an inventive vehicle brake with an actuator assembly according to the invention.

FIG. 5 shows an embodiment for the employment of a knee lever transmission as a force transmitting member in a vehicle brake which is designed as a disk brake. The brake 10 comprises a housing 20 with a brake cylinder 11 within which a brake piston 12 is slidably accommodated axially to axis A. With its free end the brake piston 12 acts on a first brake lining 13a which together with a second brake lining 13b acts on two opposite surfaces of a brake disk 14 which is designed as a friction element. A wheel brake caliper 15 is integrally connected with the housing 20 and overlaps the brake disk 14 in order to secure the second brake lining 13b.

A linear motor which is designed in the form of a piezoelectric pilot unit 21 serves as an actuator. The piezoelectric pilot unit 21 is arranged in the housing 20 in such a manner that upon an activation of the piezoelectric pilot unit 21 a linear movement axially to axis B is generated in order to actuate a plunger 22.

The axis A in which the actuation of the brake piston 12 is carried out and the axis B in which the actuation of the plunger 22 by the piezoelectric pilot unit 21 is carried out are arranged perpendicular to one another. A force transmission member which is arranged in the brake cylinder 11 serves for the conversion of the actuation of the plunger 22 to the actuation of the brake piston 12.

The knee lever transmission 30 consists of two levers 31a, 31b. The first lever 31a bears against a recess 20a of the housing 20 in location bearing style, while the second lever 31b rests in a recess 12b of the brake piston 12 in floating bearing style. A joint member 32 provides for the articulated connection between the levers 31a, 31b. An actuation of the knee lever transmission is effected via the plunger 22 which acts on the second lever 31b so that the brake piston 12 is moved in an axial direction relative to the axis A for the actuation of the brake. The input force $F_e$ which is introduced via the plunger 22 acts on the second lever 31b because a piezoelectric pilot element 21 serves as the actuator, which is best suited for the design of the knee lever transmission 30 as explained with reference to FIGS. 2a and 2b.

In addition, there is the possibility to introduce an additional input force into the knee lever transmission 30 via the joint member 32, this being based on the design as explained with reference to FIGS. 1a and 1b. This can, for example, serve to assign the disk brake the function of a parking brake, too.

A spring arrangement 33 which counteracts an actuation of the joint member 32 resets the knee lever transmission 30 to its basic position with the piezoelectric pilot unit 21 not activated so that no friction forces are applied on the brake disk 14.

A stop 34 arranged in the brake cylinder 11 ensures that the levers 31a, 31b cannot assume an axial position to the axis A or even a position beyond this because in an axial position to the axis A the force turnover point of the knee lever transmission 30 is reached exactly.

In a modification of the embodiment of FIG. 5 the point of force introduction of the plunger 22 can be shifted from the lever 31b to the lever 31a. This is advantageous in that the lateral shift of the point of force introduction along the axis A is halved. The associated disadvantage is that the installation space becomes larger because the piezoelectric pilot element 21 must be arranged further off the brake disk 14. In order to avoid this, the arrangement of the location bearing and the floating bearing can be reversed so that the actuation forces are not exerted on the brake disk 14 via the brake lining 13a, but via the brake lining 13b.

Figure 6:
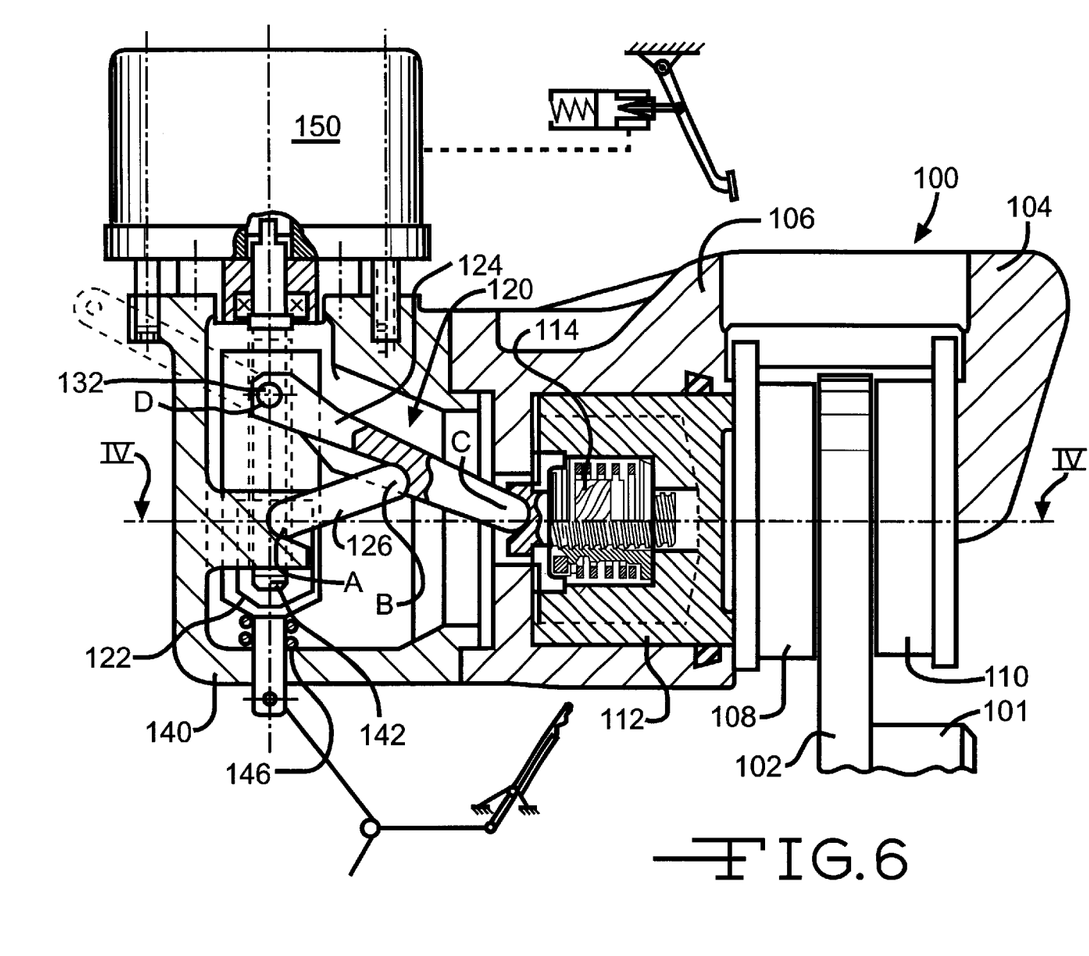
FIG. 6 shows a first embodiment of an inventive vehicle brake in a partial sectional side view, comprising an electric motor as an actuator which drives a screw and a knee lever arrangement according to the principle of the preferred embodiment according to FIGS. 3a, 3b.
Figure 6A:
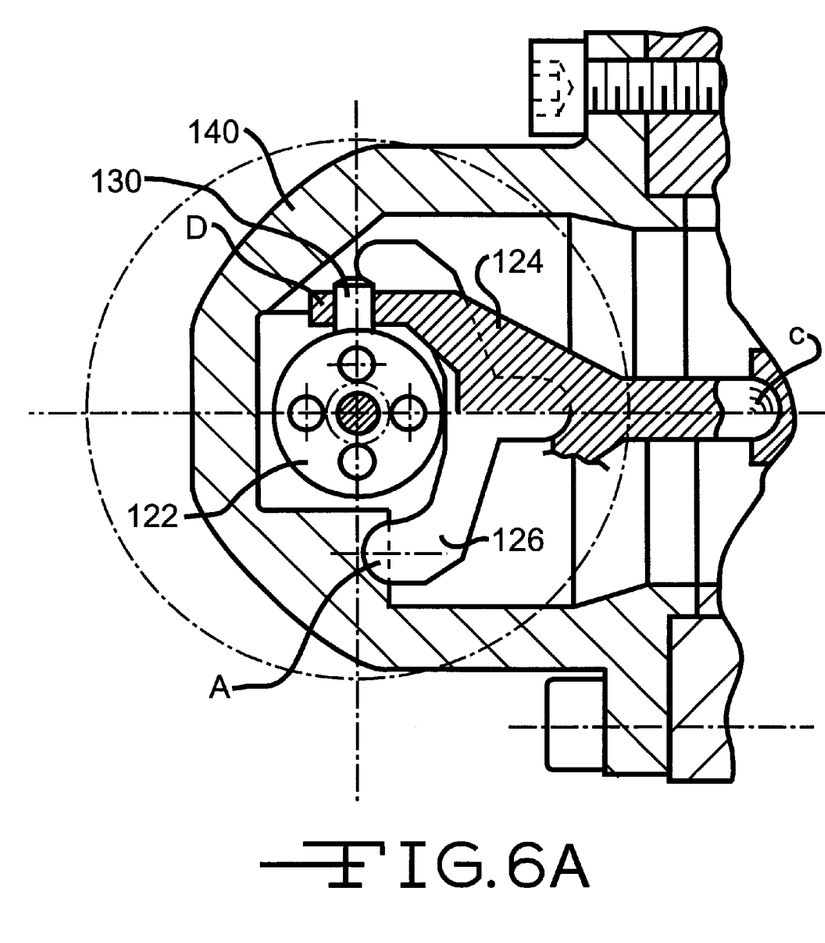
FIG. 6a shows a partial sectional view of the first embodiment according to FIG. 6 along line IV—IV in FIG. 6.

FIG. 6 shows a vehicle brake in which an electric motor is provided as the actuator, which drives a screw for transforming its rotation motion into a translation motion. The knee lever transmission is designed according to the preferred embodiment of FIGS. 3a, 3b.

The embodiment shown in FIG. 6 is a so-called "dry" design which is capable of operating without hydraulic fluid.

A floating caliper arrangement 100 which is arranged non-rotatably at an indicated stub shaft 101 radially overlaps a brake disk 102 with two arms 104, 106. Each of the arms 104, 106 supports a friction lining 108, 110 which faces towards a friction surface of the brake disk 102. The friction lining 108, which is located closer to the vehicle centre than the friction lining 110, is salably supported in a coaxial direction with respect to the brake disk 102 and can be actuated by a brake piston 112. The is arrangement is made in such a manner that a displacement of the friction lining 108 (which is located closer to the vehicle centre) towards the friction lining 102 also causes the friction lining 110 (which is further away from the vehicle centre) to be pulled against the brake disk 102 as soon as the inner friction lining 108 contacts the brake disk 102.

In the interior of the brake piston 112 an adjusting unit 114, which is known per se is arranged in order to compensate the wear of the friction linings 108, 110 as well as of the brake disk 102 by adjusting the air gap between each friction lining 108, 110 and the brake disk 102.

The axial displacement of the brake piston 112 is effected by a knee lever arrangement 120 which principally corresponds to the arrangement from FIG. 3a. The arm 124 of FIG. 6 is supported at either end in an articulated manner between the brake piston 112 and a sleeve 122 with female thread the arm 124 corresponds to the longer arm D-B-C from FIG. 3a. The arm 126 which corresponds to the shorter arm A-B from FIG. 3 the arm 126 is also supported in an articulated manner at either end acts in point B of the longer arm 124. In detail the arrangement is made in such a manner that the longer arm 124 is designed semi-spherically at its end C and engages a correspondingly shaped ball socket at the brake piston 112. At its other end D, the longer arm 124 is split in a fork shaped manner into two fingers and partially overlaps the female threaded sleeve 122. Via pivot connections 130, 132 on both fingers of the fork-shaped end of the longer arm 124, the arm 124 is hinged at the sleeve 122. The shorter arm 126 is also split in a fork-shaped manner into two fingers at its end A and overlaps the sleeve 122. The ends of the fingers of the fork-shaped end A of the shorter arm 126 are of semi-spherical design and each bears against a correspondingly shaped ball socket in the housing 140.

The female threaded sleeve 122 accommodates a threaded rod 142 which is connected non-rotatably with the output shaft of an electric motor 150 which is attached at the housing 140. At the end of the sleeve 122, thread which faces away from the electric motor 150, the sleeve bears against the housing 140 by means of a coil spring 146 as an axial extension of the threaded rod 142. Upon an activation of the electric motor 150 the threaded rod 142 rotates with the consequence that the female threaded sleeve 122 moves up and down along the threaded rod 142 depending on the direction of rotation of the electric motor 150 and thereby drives the end D of the longer arm 124. The consequence of this is that the brake piston 112 is moved to and for so that the friction lining 108 is moved towards the brake disk 102 or away from the same.

Moreover, two possibilities are shown in FIG. 6 for transferring the function of the parking brake to the disk brake. On the one hand, a Bowden transmission which is connected with an actuation means (pedal, brake lever) acts on the non-rotatable, though movable, sleeve 122 via a splined plug connection. On the other hand (indicated by broken lines), the longer arm 124 of the knee lever transmission may be extended in such a manner that it projects through an elongated hole from the housing 140 of the vehicle brake and can thus be operated via a Bowden transmission. The embodiment with the extended arm 124, in particular, allows for building up such high brake forces that even the legal requirements for an emergency braking operation are met.

Figure 7:
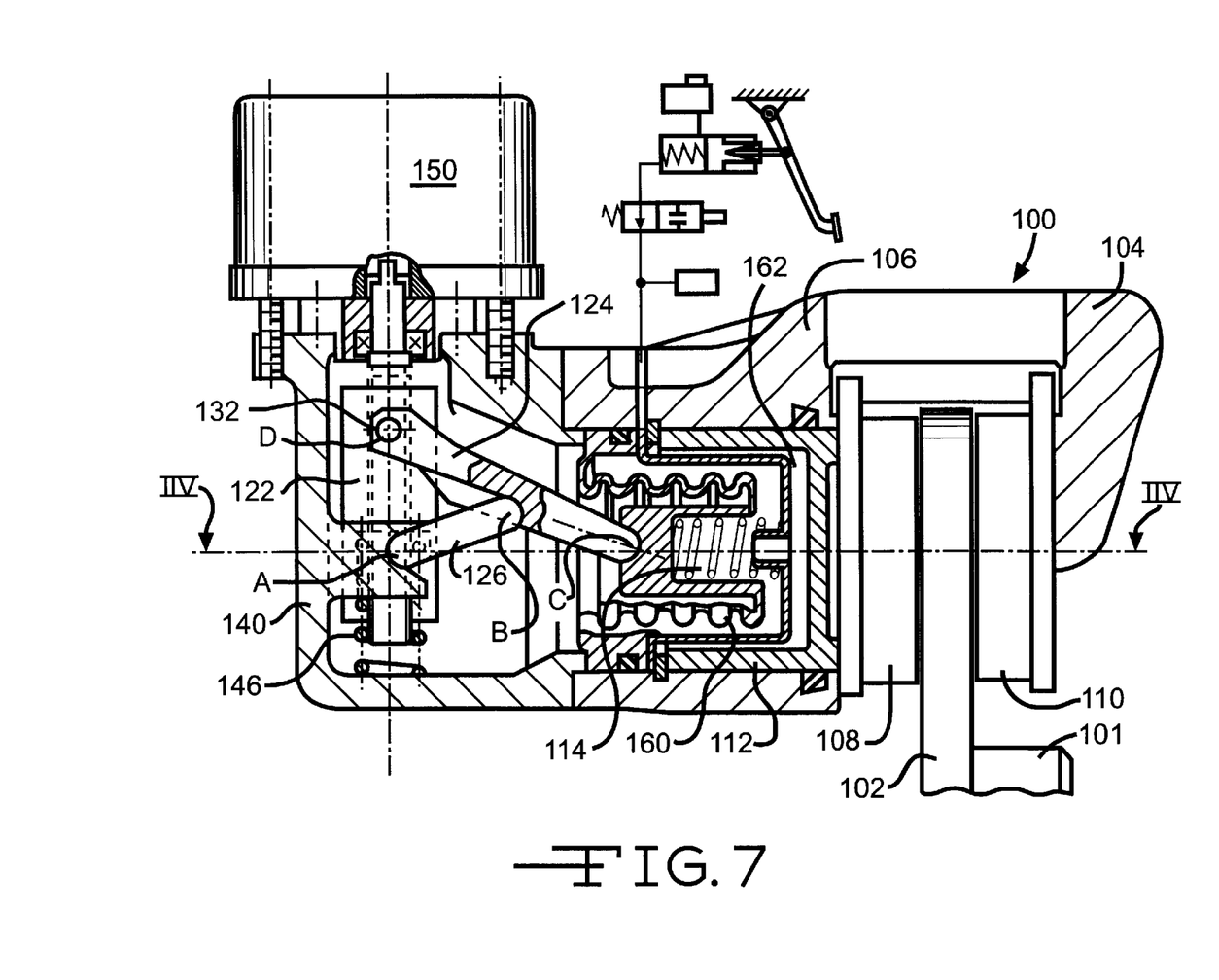
FIG. 7 shows a second embodiment of an inventive vehicle brake in a partial sectional side view, comprising an electric motor as an actuator which drives a screw and a knee lever arrangement according to the principle of the preferred embodiment according to FIGS. 3a, 3b.
Figure 7A:
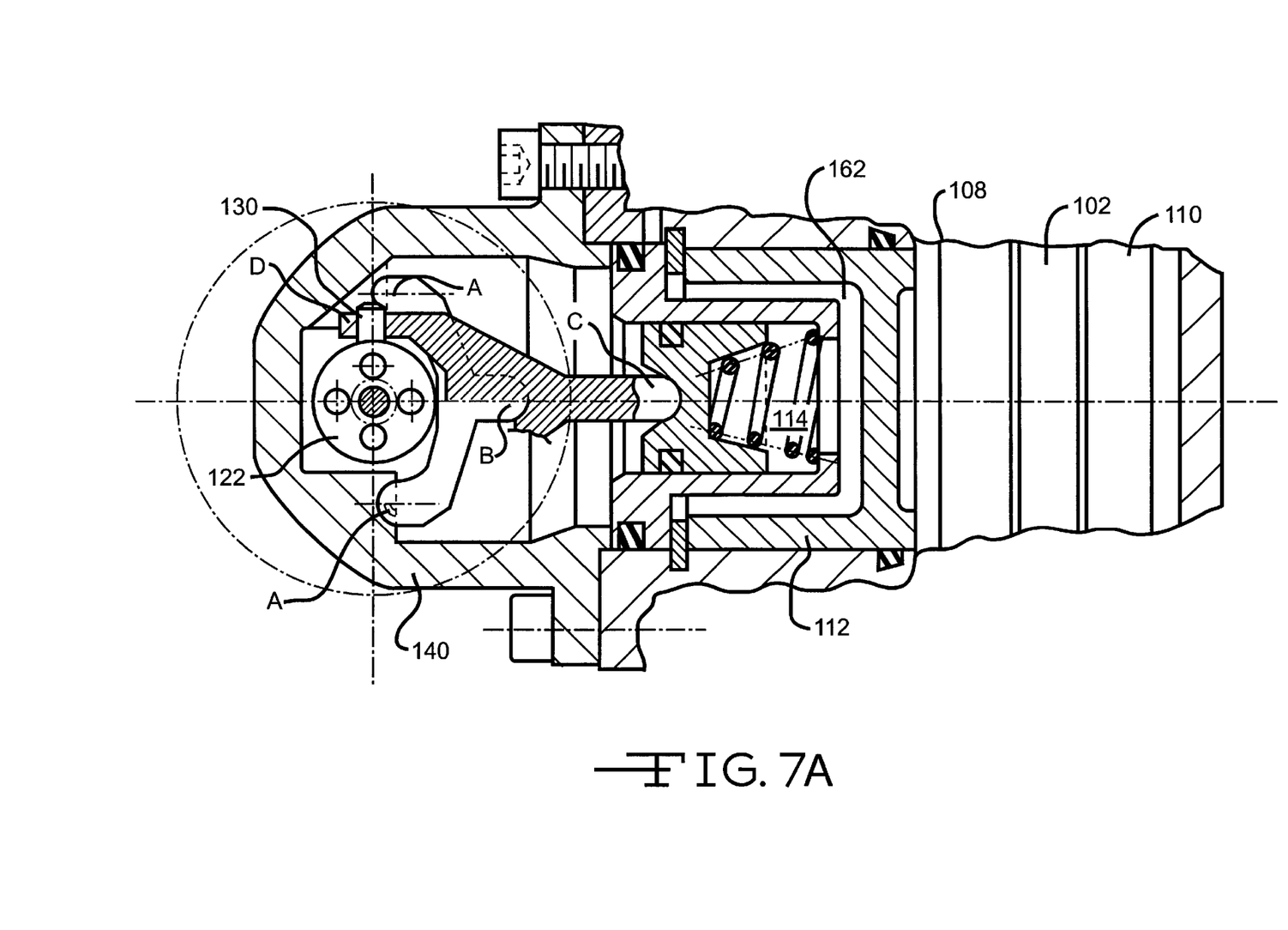
FIG. 7a shows a partial sectional view of the second embodiment according to FIG. 6 along line IIV—IIV in FIG. 7.

The components of FIG. 7 which, compared to FIG. 6, are of equal design or of equal effect are assigned identical reference numerals and are not explained again.

Compared to FIG. 6, FIG. 7 comprises a hydraulic chamber 162 for the actuation of the brake piston. The knee lever transmission output side actuates an inner piston arranged within the brake piston, which reduces the volume of the hydraulic chamber 162 for the generation of a brake pressure. The advantages of this embodiment are that due to the additional hydraulic transmission step the electric motor, the screw drive, and as the knee lever transmission can be designed weaker. Consequently, this solution is more advantageous with respect to installation space and costs. Moreover, the adjustment in the case of wear of the brake disk 102 or of the friction linings 108, 110, respectively, can be effected in a simple manner according to the known "rollback" principle by the contraction of the rubber bellows 160. Finally, a hydraulic emergency actuation via the brake pedal which is also referred to as "push-through" is possible in a conventional manner, for example in the case of a failure of the electric power supply.

What is claimed is:

1. An actuator assembly for a vehicle brake with an electric drive which is connected with an input side of a transmission, with an output side of the transmission being adapted for the actuation of at least one friction element of the vehicle brake, characterized in that the transmission is a knee lever arrangement with two arms connected with each other in an articulated manner which in their rest position include an angle of approximately 160 degrees, and which in their actuated position include an angle greater than the included angle in their rest position, and with one arm of the knee lever arrangement being supported in an articulated manner in a location bearing in a housing and another arm being connected with an axially movable friction lining via a floating bearing.

2. The actuator assembly according to claim 1, characterized in that the drive is a piozoelectric pilot means.

3. The actuator assembly according to claim 1, characterized in that the drive is an electric motor with a screw drive.

4. The actuator assembly according to claim 1, characterized in that the drive introduces actuation forces into the knee lever arrangement in the area of a joint which connects the two arms with each other.

5. The actuator assembly according to claim 1, characterized in that the drive introduces actuation forces into the knee lever arrangement in the area of one of the two arms.

6. The actuator assembly according to claim 1, characterized in that one of the two arms projects by the length of the other arm beyond a joint connecting the two arms with each other, with the drive introducing actuation forces into the knee lever arrangement in the area of its free end in the direction of the other joint of the other arm.

7. The actuator assembly according to claim 1, wherein in the joint connecting the two arms a Bowden transmission actuation acts additionally for arresting the friction linings in their actuated position.

8. A vehicle brake comprising:
   a brake piston including an axially movable friction lining;
   a friction element which is rotatable relative to the axially moveable friction lining and which is adapted to be selectively engaged by the friction lining to effect braking of a vehicle; and
   an actuator assembly including a housing, a transmission having an input side and an output side, the output side of the transmission being adapted for the actuation of the friction lining of the vehicle brake, and an electric drive which is connected with the input side of the transmission, the transmission being a knee lever arrangement with two arms which in their rest position form an angle to one another, and with one arm of the knee lever arrangement being supported in a location bearing in the housing and another arm being connected with the axially movable friction lining via a floating bearing on one end and a driven member that moves generally perpendicular to the axis of motion of the axially moveable &fiction lining at the other end.

9. The vehicle brake according to claim 8, wherein the axial displacement of the brake piston is effected by a knee lever arrangement which comprises a longer arm between the brake piston and a sleeve with female thread the longer arm defining a pivot point thereon, which is supported in an articulated manner at both ends, and a shorter arm which is supported in an articulated manner at both ends and acts in the pivot point of the longer arm.

10. The vehicle brake according to claim 9, with the longer arm being designed semi-spherically at its end engaging the brake piston and engaging a correspondingly shaped ball socket at the brake piston, and at its other end the longer arm being split in a fork-shaped manner and partially overlapping the sleeve with female thread.

11. The vehicle brake according to claim 10, with the longer arm being hinged via a pivot connection at both ends of the fork-shaped end of the arm at the sleeve with female thread.

12. The vehicle brake according to claim 10, with the shorter arm being split in a fork-shaped manner at its end engaging the sleeve and overlapping the sleeve with female thread, and with the two ends of the fork-shaped end of the shorter arm being of a semi-spherical design and each bearing against a correspondingly shaped ball socket in the housing.

13. The vehicle brake according to claim 8, with a threaded rod being accommodated in the sleeve with female thread, which is connected non-rotatably with the output shaft of an electric motor which is attached at the housing.

14. The vehicle brake according to claim 8, wherein in the joint connecting the two arms a Bowden transmission actuation acts additionally for arresting the friction linings in their actuated position.

15. The vehicle brake according to claim 8, characterized in that the drive is a piezoelectric pilot means.

16. The vehicle brake according to claim 8, characterized in that the drive is an electric motor with a screw drive.

17. The vehicle brake according to claim 8, characterized in that the drive introduces actuation forces into the knee lever arrangement in the area of a joint which connects the two arms with each other.

18. The vehicle brake according to claim 8, characterized in that the drive introduces actuation forces into the knee lever arrangement in the area of one of the two arms.

19. The vehicle brake according to claim 8, characterized in that one of the two arms projects by the length of the other arm beyond a joint connecting the two arms with each other, with the drive introducing actuation forces into the knee lever arrangement in the area of its free end in the direction of the other joint of the other arm.

20. A vehicle brake comprising:
    a brake piston including an axially movable friction lining;

a friction element which is rotatable relative to the axially friction lining and which is adapted to be selectively engaged by the friction lining to effect braking of a vehicle;

an actuator assembly including a housing, a transmission having an input side and an output side, the output side of the transmission being adapted for the actuation of the friction lining of the vehicle brake, and an electric drive which is connected with the input side of the transmission, the transmission being a knee lever arrangement with two arms which in their rest position form an angle to one another, and with one arm of the knee lever arrangement being supported in a location bearing in the housing and another arm being connected with the axially movable friction lining via a floating bearing; and a Bowden transmission actuation in a joint connecting the two arms, the Bowden transmission actuation acting additionally for arresting the friction linings in their actuated position.

21. A vehicle brake comprising:

a brake piston including an axially movable friction lining and a ball socket defined thereon;

a friction element which is rotatable relative to the axially friction lining and which is adapted to be selectively engaged by the friction lining to effect braking of a vehicle; and an actuator assembly including a housing, a transmission having an input side and an output side, the output side of the transmission being adapted for the actuation of the friction lining of the vehicle brake, and an electric drive which is connected with the input side of the transmission via a sleeve with female thread, the transmission being a knee lever arrangement with two arms, the arms in their rest position forming an angle to one another, one of the two arms being a longer arm of the two arms, the longer arm defining a pivot point thereon, the longer arm being supported in an articulated manner at both ends and extending between the axially movable friction lining and the sleeve with female thread, the longer arm having one end thereof designed semi-spherically and engaging the ball socket defined on the brake piston so that the longer arm is connected with the axially movable friction lining via a floating bearing, the longer arm being split in a fork-shaped matter at the other end thereof and partially overlapping the sleeve with female thread, the other of the two arms being a shorter arm of the two arms, the shorter arm of the knee lever arrangement being supported in an articulated manner at both ends, with one end of the shorter arm being supported in a location bearing in the housing and the other end of the shorter arm acting in the pivot point of the longer arm.

\* \* \* \* \*

UNITED STATES PATENT AND TRADEMARK OFFICE
CERTIFICATE OF CORRECTION

PATENT NO. : 6,412,608 B1
DATED : July 2, 2002
INVENTOR(S) : Kurt Mohr et al.

It is certified that error appears in the above-identified patent and that said Letters Patent is hereby corrected as shown below:

Column 7,
Line 2, delete "piozoelectric" and insert -- piezoelectric --.

Column 8,
Line 8, after "thread" insert a -- , --.
Line 14, delete "&fiction" and insert -- friction --.

Signed and Sealed this

Twenty-fourth Day of September, 2002

Attest:

JAMES E. ROGAN
Attesting Officer    Director of the United States Patent and Trademark Office